United States Patent
Loscher et al.

(10) Patent No.: US 10,740,749 B2
(45) Date of Patent: Aug. 11, 2020

(54) SYSTEM AND METHOD FOR MANAGING A PROTECTION MECHANISM USING A DIGITAL WALLET PLATFORM

(71) Applicant: MasterCard International Incorporated, Purchase, NY (US)

(72) Inventors: Pamela H Loscher, Amawalk, NY (US); Wei Xu, Millwood, NY (US); Frank Charles Barbuto, New Rochelle, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 824 days.

(21) Appl. No.: 15/169,936

(22) Filed: Jun. 1, 2016

(65) Prior Publication Data
US 2017/0352025 A1    Dec. 7, 2017

(51) Int. Cl.
| | |
|---|---|
| *G06Q 20/00* | (2012.01) |
| *G06Q 20/36* | (2012.01) |
| *G06Q 40/08* | (2012.01) |
| *G06Q 30/06* | (2012.01) |
| *G06Q 20/40* | (2012.01) |

(52) U.S. Cl.
CPC ........... *G06Q 20/367* (2013.01); *G06Q 20/36* (2013.01); *G06Q 20/40* (2013.01); *G06Q 30/0609* (2013.01); *G06Q 40/08* (2013.01)

(58) Field of Classification Search
USPC .......................................................... 705/41
See application file for complete search history.

(56) References Cited

U.S. PATENT DOCUMENTS

| | | | |
|---|---|---|---|
| 5,235,507 A | 8/1993 | Sackler et al. | |
| 8,630,898 B1 * | 1/2014 | Knackstedt | G06Q 30/0207 |
| | | | 705/14.17 |
| 9,413,893 B2 * | 8/2016 | Hurst | G06F 11/0742 |
| 9,483,344 B2 * | 11/2016 | Hurst | G06F 21/577 |
| 2002/0019804 A1 | 2/2002 | Sutton | |
| 2002/0128883 A1 | 9/2002 | Harris | |
| 2002/0198743 A1 | 12/2002 | Ariathurai et al. | |
| 2003/0154111 A1 | 8/2003 | Dutra et al. | |

(Continued)

OTHER PUBLICATIONS

Your Credit Card's Extended Warranty Policy: A guide (Year: 2015).*

(Continued)

*Primary Examiner* — Bruce I Ebersman

(57) ABSTRACT

Embodiments of the disclosure enable one or more protection mechanisms to be managed using a digital wallet platform. Product data associated with a product is identified. The product data is analyzed to identify one or more potential protection mechanisms associated with the product. At least one protection mechanism is identified from the potential protection mechanisms, and the product is registered with a protection system such that the at least one protection mechanism provides protection for the product. A protection capsule corresponding to the at least one protection mechanism is generated. The protection capsule is accessible using a digital wallet. Aspects of the disclosure provide for utilizing the digital wallet for a plurality of functions including payment card management, financial account management, and protection mechanism management.

20 Claims, 7 Drawing Sheets

(56) References Cited

U.S. PATENT DOCUMENTS

| | | | |
|---|---|---|---|
| 2012/0191484 A1* | 7/2012 | Van | G06Q 20/20 705/4 |
| 2014/0207680 A1* | 7/2014 | Rephlo | G06Q 20/322 705/44 |
| 2014/0279005 A1* | 9/2014 | Calman | G06Q 30/0215 705/14.58 |
| 2015/0100442 A1 | 4/2015 | Van Heerden | |
| 2015/0254639 A1 | 9/2015 | Radu | |
| 2016/0275521 A1* | 9/2016 | Afshar | G06Q 30/012 |
| 2016/0344870 A1* | 11/2016 | Nair | H04M 3/5191 |

OTHER PUBLICATIONS

Berthon, Claude, "International Search Report", International Application No. PCT/US2017/034109, dated Aug. 2017, 5 pages.

Berthon, Claude, "Written Opinion", International Application No. PCT/US2017/034109, dated Aug. 17, 2017, 7 pages.

* cited by examiner

SYSTEM AND METHOD FOR MANAGING A PROTECTION MECHANISM USING A DIGITAL WALLET PLATFORM

FIELD OF THE DISCLOSURE

The subject matter described herein relates generally to information management and, more specifically, to managing a protection mechanism using a digital wallet platform.

BACKGROUND

Financial transaction cards have made great gains as a means to attract financial accounts to financial institutions and, in the case of credit cards, as a medium to create small loans and generate interest income for financial institutions. With the advancement mobile technology, the use of digital wallets has been increasingly prevalent. However, with at least some known digital wallets being limited in functionality, a computing device may include a plurality of digital wallets to perform a plurality of functionalities. For example, a first standalone digital wallet may be used for performing a first function, and a second standalone digital wallet may be used for performing a second function. Navigating across a plurality of standalone digital wallets, however, may be tedious, burdensome, and/or time-consuming and could cause cardholders to become increasingly inconvenienced, annoyed, and/or frustrated with each use of a digital wallet.

SUMMARY

Embodiments of the disclosure enable a computing device to manage one or more protection mechanisms. The computing device includes a memory device storing data associated with one or more digital wallets and computer-executable instructions, and a processor configured to execute the computer-executable instructions to identify a product associated with a financial transaction, identify one or more potential protection mechanisms associated with the product, transmit to a client device a first electronic communication associated with the one or more potential protection mechanisms, receive from the client device a second electronic communication associated with a selection of at least one protection mechanism, identify a protection system associated with the at least one protection mechanism, transmit to the protection system a third electronic communication to register the product with the protection system such that the at least one protection mechanism provides protection for the product, and generate a protection capsule corresponding to the at least one protection mechanism. The protection capsule is accessible using a digital wallet of the one or more digital wallets.

In another aspect, a computer-implemented method is provided for managing one or more protection mechanisms configured to protect one or more products. The computer-implemented method includes obtaining product data associated with a product that is associated with a financial transaction, identifying one or more potential protection mechanisms associated with the product, transmitting to a client device protection data associated with the one or more potential protection mechanisms, receiving from the client device selection data associated with a protection mechanism, analyze the selection data to generate a request for registration associated with the product, transmitting to a protection system the request for registration associated with the protection mechanism, receiving from the protection system a response to the request for registration including statement data associated with a registration of the product with the protection system, and analyze the statement data to generate a protection capsule corresponding to the protection mechanism. The protection capsule is accessible using a digital wallet of the one or more digital wallets.

In yet another aspect, a computer-readable storage device having computer-executable instructions embodied thereon is provided. The computer-readable storage device includes a financial transaction component, a protection mechanism component, and a digital wallet component. The financial transaction component causes the computing device to identify product data associated with a product that is associated with a financial transaction. The protection mechanism registration component causes the computing device to analyze the product data to identify one or more potential protection mechanisms associated with the product, and generate a request for registration associated with the product for registering the product with a protection system associated with a protection mechanism of the one or more potential protection mechanisms. The digital wallet component causes the computing device to identify the protection mechanism, and generate a protection capsule corresponding to the protection mechanism. The protection capsule is accessible using a digital wallet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
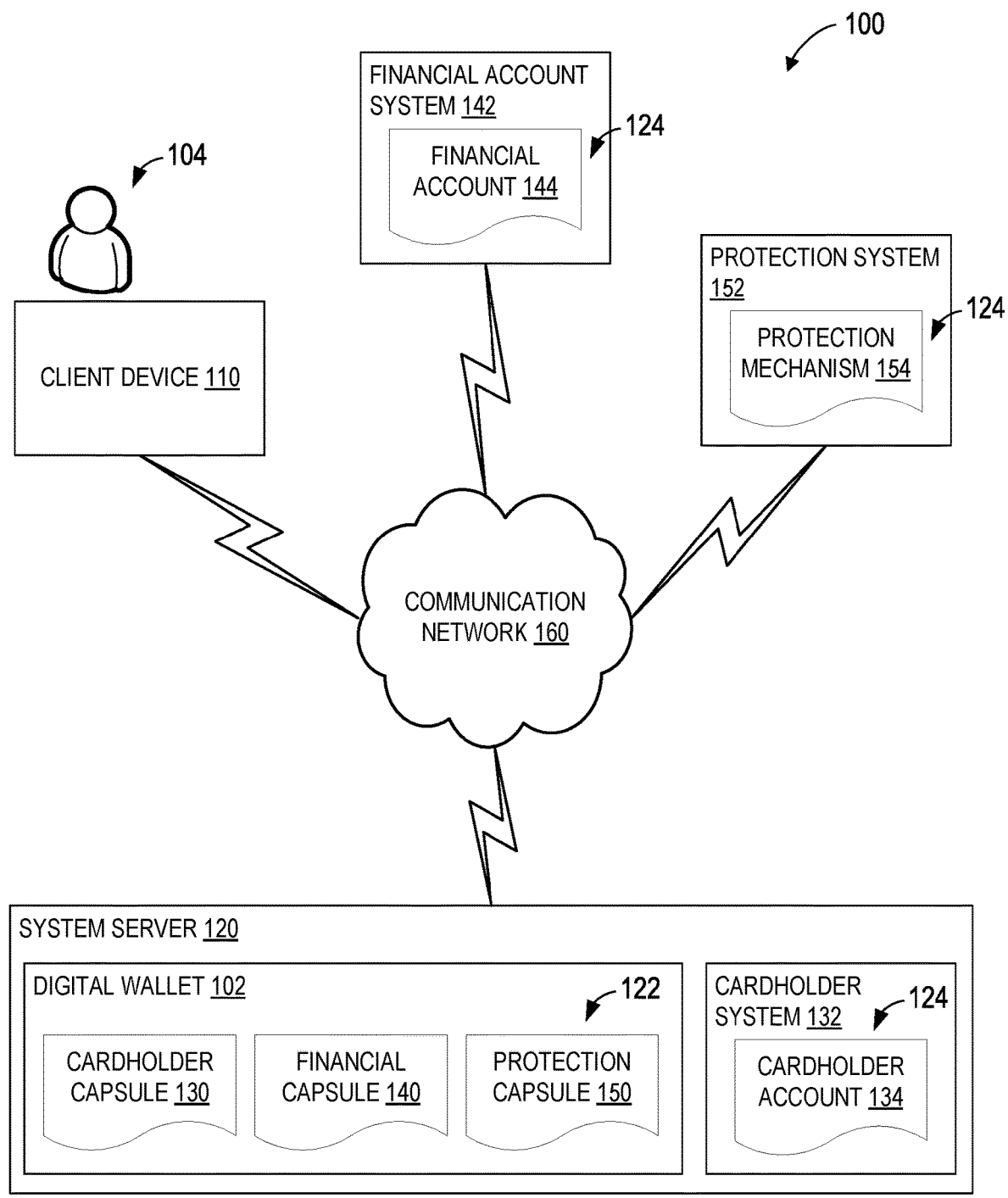
FIG. 1 is a block diagram illustrating an example system for managing one or more protection mechanisms.

The subject matter described herein relates to systems and methods for managing one or more protection mechanisms (e.g., insurance policies, warranties) configured to protect one or more commercial products (e.g., goods or services). Embodiments of the disclosure provide the ability to utilize a digital wallet to perform one or more functions. For example, the digital wallet may include one or more wallet capsules that correspond to one or more accounts (e.g., cardholder accounts, credit accounts, debit accounts, financial accounts, banking accounts, investment accounts, loyalty program accounts, insurance policies), and allow a user to manage and/or utilize the accounts via the wallet capsules. Embodiments of the disclosure may identify product data associated with a product, analyze the product data to identify one or more potential protection mechanisms associated with the product, register the product with a protection system for providing protection for the product using at least one protection mechanism, and generate a protection capsule corresponding to the protection mechanism. The protection capsule may include, for example, an information cluster for the protection mechanism. The embodiments described herein are adapted to configure a digital wallet to perform a plurality of functions including payment card management, financial account management, and protection mechanism management.

Aspects of the disclosure provide for a computing device that processes one or more transactions in an environment including a plurality of devices coupled to each other via a network (e.g., a local area network (LAN), a wide area network (WAN), the Internet). For example, a digital wallet platform may be used to communicate with one or more other computing systems (e.g., a client device, a cardholder system, a financial account system, a protection system) to receive or retrieve a request for authorization, a transaction receipt, a protection statement, a request for relief, and/or other transaction-related data to facilitate processing the one or more transactions (e.g., entering into a financial product associated with a product, registering the product with a protection system, submitting a request for relief with the protection system, receiving payment or reimbursement). In this manner, a variety of accounts may be accessible via a common digital wallet platform.

The systems and processes described herein may be implemented using computer programming or engineering techniques including computer software, firmware, hardware or a combination or subset thereof. At least one technical problem with known systems is that, with the volume of transactions and the diversity of functions performed on a computing device, it can be difficult, time-consuming, and/or onerous to navigate across a plurality of digital wallets to access a plurality of accounts and perform a plurality of functions. The embodiments described herein address at least this technical problem. By processing transactions in the manner described in this disclosure, some embodiments improve user experience, user efficiency, and/or user interaction performance by having a common digital wallet platform that allows various types of accounts to be accessed for performing a broad range of functions. In this manner, the embodiments described herein may facilitate increasing a functionality of a digital wallet by providing an integrated user interface with increased and/or improved capabilities. Additionally, some embodiments may reduce processor load by reducing an amount of data to be analyzed or processed, reduce network bandwidth usage and/or improve communication between systems by reducing an amount of data to be transmitted, improve processor security and/or data transmission security by managing access to various accounts using a digital wallet platform, and/or reduce error rate by automating the analysis and processing of transactions and simplifying the claim process. In some embodiments, the subject matter described herein may facilitate increasing processor speed and/or improving operating system resource allocation.

The technical effect of the systems and processes described herein is achieved by performing at least one of the following operations: a) receiving a request for access associated with a digital wallet; b) identifying one or more wallet capsules associated with the digital wallet; c) transmitting a response to the request for access including capsule data associated with the wallet capsules; d) receiving a request for authorization associated with a financial transaction; e) generating a transaction receipt associated with the financial transaction; f) analyzing the request for authorization or transaction receipt to identify transaction data associated with the financial transaction; g) obtaining or identifying product data associated with a product that is associated with the financial transaction; h) generating a request for identification associated with the product; i) transmitting the request for identification; j) receiving one or more responses to the request for identification including protection data associated with one or more potential protection mechanisms; k) identifying the potential protection mechanisms associated with the product; l) transmitting protection data associated with the potential protection mechanisms; m) receiving selection data associated with at least one protection mechanism; n) identifying at least one protection mechanism; o) identifying at least one protection system associated with the at least one protection mechanism; p) registering the product with the protection system for providing protection for the product using the protection mechanism; q) generating a request for registration associated with the product; r) transmitting the request for registration; s) receiving a response to the request for registration including statement data; t) generating a protection capsule corresponding to the protection mechanism; u) determining whether a protection term associated with the protection mechanism satisfies a predetermined threshold; v) generating a prompt for user input associated with the protection mechanism; w) transmitting the prompt for user input associated with the protection mechanism; x) receiving a request for relief associated with the product; y) analyzing the request for relief to identify the protection system associated with the protection mechanism; z) transmitting a request for relief associated with the product; aa) receiving a response to the request for relief including disposition data associated with the protection mechanism; ab) modifying the protection capsule corresponding to the protection mechanism; ac) generating a prompt for user input associated with a financial account; ad) transmitting the prompt for user input associated with the financial account; ae) receiving selection data associated with the financial account; af) generating a request for transfer associated with the financial account; ah) transmitting the request for transfer; ag) receiving a confirmation of a transfer of electronic funds to the financial account; and ah) modifying the financial capsule corresponding to the financial account.

FIG. 1 is a block diagram illustrating an example system 100 for managing one or more protection mechanisms (e.g., insurance policies, warranties) that are configured or adapted to provide protection for one or more commercial products (e.g., goods or services). The system 100 includes one or more electronic or digital wallets 102 that allow one or more consumers 104 to enter into and manage one or more transactions. A consumer 104 may use, for example, a client device 110 to access or utilize a digital wallet 102 associated with the consumer 104. The client device 110 may be any computing device configured to communicate with another computing device including, without limitation, a mobile device, a portable media player, a phablet, a tablet, a netbook, a laptop, a desktop computer, and the like.

To determine whether the consumer 104 is associated with or authorized to access a digital wallet 102, a digital wallet platform or system server 120 may receive from the client device 110 a request for access including login credentials (e.g., wallet identifier, password) associated with the digital wallet 102, and compare the login credentials with one or more registered credentials stored at the system server 120. The system server 120 may be a single computing device or a plurality of interconnected computing devices that operate together to perform a particular function. That is, the system server 120 may be contained within a single hardware unit or be distributed among several or many different hardware units, including in a "cloud"-based architecture.

If the login credentials do not correspond to the registered credentials, the consumer 104 may be identified as not being authorized to access the digital wallet 102. If, on the other hand, the login credentials correspond to registered credentials associated with a digital wallet 102, the consumer 104 may be identified as being authorized to access the digital wallet 102. In some embodiments, one or more wallet capsules 122 associated with the digital wallet 102 are identified, a response to the request for access including capsule data associated with the wallet capsules 122 is generated, and the response to the request for access is transmitted to the client device 110. A wallet capsule 122 includes computer-readable instructions, data structures, program modules, or other data that enables the digital wallet 102 to function as described herein. Capsule data may be stored and maintained at one or more computing devices, including the client device 110 and/or the system server 120. For example, at least a portion of capsule data associated with a client-oriented wallet capsule 122 may be stored and maintained at the client device 110, and at least a portion of capsule data associated with a server-oriented wallet capsule 122 may be stored and maintained remote from the client device 110 (e.g., at the system server 120).

The wallet capsules 122 are configured to communicate with one or more computing devices to access one or more accounts 124 associated with the consumer 104 for performing one or more functions. For example, the digital wallet 102 may include one or more cardholder capsules 130 that allow the consumer 104 to communicate with one or more cardholder systems 132 to access one or more cardholder accounts 134 for entering into one or more financial transactions, one or more financial capsules 140 that allow the consumer 104 to communicate with one or more financial account systems 142 to access one or more financial accounts 144 for transferring electronic funds between financial accounts 144, and/or one or more protection capsules 150 that allow the consumer 104 to communicate with one or more protection systems 152 to obtain one or more protection mechanisms 154 configured or adapted to provide protection or coverage for a consumer product.

A protection capsule 150 residing in the client device 110 may be protected, for example, by a password, personal identification number (PIN), biometric data (e.g., photograph, fingerprint, iris scan, retinal scan, voice print, ear scan, deoxyribonucleic acid (DNA) profile), or any other mechanism that may be used to authenticate the consumer 104. The system server 120 is configured to synchronize, validate, and/or update the protection capsule 150 with data stored at the system server 120 (e.g., a corresponding protection capsule 150 residing in the system server 120). In some embodiments, the protection capsule 150 is a stand-alone capsule, and is accessible through an application without accessing the digital wallet 102.

Cardholder data associated with the cardholder capsule 130 may be used to identify a cardholder account 134 and/or a characteristic or feature of the cardholder account 134, and enables the consumer 104 to access or utilize the cardholder account 134. In some embodiments, the cardholder system 132 is integrated or included in the system server 120. Alternatively, the cardholder system 132 may be remote or distinct from the system server 120. The system server 120 and/or cardholder system 132 is configured to process one of more financial transactions. For example, the cardholder system 132 may receive a request for authorization for a financial transaction associated with a cardholder account 134, and generate a response to the request for authorization. The request for authorization may include transaction data associated with the financial transaction, such as cardholder account data (e.g., a cardholder account identifier, an expiration date, a security code), delivery data (e.g., a shipping or delivery address), and product data (e.g., a transaction amount, a product identifier). A product identifier may include, for example, Universal Product Code (UPC) data, stock-keeping unit (SKU) data, and the like. In some embodiments, the system server 120 generates a transaction receipt associated with the financial transaction to record a status of the financial transaction. Alternatively, at least a portion of the transaction receipt may be generated at another computing device (e.g., client device 110, merchant computing device) and transmitted to the system server 120. The transaction receipt may include transaction data associated with the financial transaction, including the transaction data associated with the request for authorization.

Financial data associated with the financial capsule 140 may be used to identify a financial account 144 and/or a characteristic or feature of the financial account 144, and enables the consumer 104 to access or utilize the financial account 144. The financial account system 142 is configured to transfer electronic funds to and/or from a financial account 144. For example, the financial account system 142 may receive electronic funds for depositing into a financial account 144, and generate a confirmation of a transfer of electronic funds indicating an increase in electronic funds associated with the financial account 144. For another example, the financial account system 142 may receive a request for transfer associated with a financial account 144, transfer electronic funds to another financial account 144, and generate a confirmation of a transfer of electronic funds indicating a decrease in electronic funds associated with the financial account 144. The request for transfer may include financial account data (e.g., a financial account identifier, transfer amount). In some embodiments, electronic funds are transferred between a plurality of financial accounts 144 associated with a common financial account system 142. Alternatively, at least one financial account 144 is associated with a financial account system 142 different from a financial account system 142 associated with one or more other financial accounts 144.

Protection data associated with the protection capsule 150 may be used to identify a protection mechanism 154 and/or a characteristic or feature of the protection mechanism 154, and enables the consumer 104 to access or utilize the protection mechanism 154. The protection system 152 is configured to manage one or more protection mechanisms 154 associated with a covered product. For example, the protection system 152 may receive a request to identify one or more potential protection mechanisms 154 associated with a product, and generate a response to the request for identification including protection data associated with the potential protection mechanisms 154. For another example, the protection system 152 may receive a request to register the product with the protection system 152, and generate a response to the request for registration (e.g., a protection statement) including statement data associated with the protection mechanism 154. For yet another example, the protection system 152 may receive a request to obtain relief under the protection mechanism 154 (e.g., a claim), and generate a claim disposition including disposition data associated with the protection mechanism 154. The claim may include statement data associated with the protection mechanism 154. In some embodiments, at least a portion of the claim disposition includes a request for transfer associated with transferring electronic funds from a first financial account 144 associated with a first financial account system 142 to a second financial account 144 associated with a second financial account system 142.

In some embodiments, one or more other wallet capsules 122 are hyperlinked or electronically coupled to another wallet capsule 122 to allow the consumer 104 to navigate across a plurality of wallet capsules 122. For example, a protection capsule 150 associated with a product may be hyperlinked or coupled to a transaction receipt for a financial transaction associated with the product such that protection data, cardholder account data, and other data associated with the product, the protection mechanism 154 and/or the financial transaction are readily accessible. A hyperlink may allow the consumer 104 to access data corresponding to the hyperlink when user input (e.g., clicking, hovering) indicative of a user interest in accessing the corresponding data is provided.

The system 100 includes one or more communication networks 160 that enable data to be transferred between a plurality of computing devices (e.g., client device 110, system server 120, cardholder system 132, financial account system 142, protection system 152) coupled to the communication network 160. Example communication networks 160 include a cellular or mobile network and the Internet. Alternatively, the communication network 160 may be any communication medium that enables the system 100 to function as described herein including, for example, a personal area network (PAN), a LAN, and/or a WAN.

Figure 2:
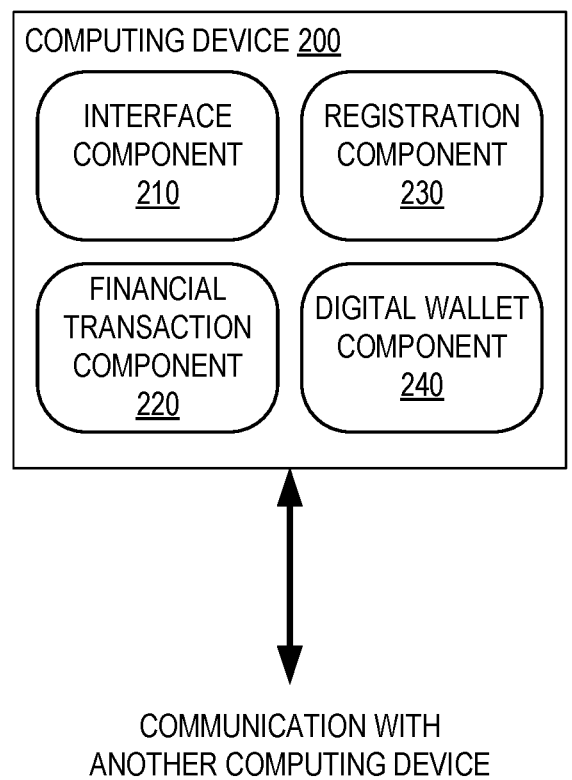
FIG. 2 is a block diagram illustrating an example computing device including a plurality of components that may be used to process one or more transactions using a digital wallet platform.

FIG. 2 is a block diagram illustrating an example computing device 200 (e.g., system server 120) for processing one or more transactions using a digital wallet platform. For example, the computing device 200 may be used to register a commercial product with a protection system 152 for obtaining protection or coverage for the product under a protection mechanism 154, and process a claim associated with the product to obtain relief under the protection mechanism 154. To enable the computing device 200 to process one or more transactions using a digital wallet platform, the computing device 200 may include, for example, an interface component 210, a financial transaction component 220, a registration component 230, and/or a digital wallet component 240.

The interface component 210 enables the computing device 200 to communicate with another computing device, such as a client device 110 (shown in FIG. 1), a cardholder system 132 (shown in FIG. 1), a financial account system 142 (shown in FIG. 1), and/or a protection system 152 (shown in FIG. 1). For example, the interface component 210 may be configured to communicate with a client device 110 to receive a request for access associated with a digital wallet 102, transmit a response to the request for access, receive a request for authorization associated with a financial transaction, transmit a response to the request for authorization, transmit a prompt for user input associated with one or more potential protection mechanisms 154, receive selection data associated with a protection mechanism 154, transmit a prompt for user input associated with the protection mechanism 154, receive a claim associated with the product, transmit a response to the claim, transmit a prompt for user input associated with a financial account 144, and/or receive selection data associated with the financial account 144. For another example, the interface component 210 may be configured to communicate with a financial account system 142 to transmit a request for transfer and/or receive a confirmation of a transfer of electronic funds. For yet another example, the interface component 210 may be configured to communicate with a protection system 152 to transmit a request for identification, receive a response to the request for identification, transmit a request for registration, receive a response to the request for registration, transmit a claim associated with the product, and/or receive a response to the claim. The interface component 210 may be coupled to a communication network 160 (shown in FIG. 1) to facilitate communication between the computing device 200 and another computing device (e.g., client device 110, cardholder system 132, financial account system 142, protection system 152) via the communication network 160. In some embodiments, the interface component 210 is coupled to and/or communicates with the financial transaction component 220, the registration component 230, and/or the digital wallet component 240 to facilitate communication between the interface component 210, the financial transaction component 220, the registration component 230, and/or the digital wallet component 240.

The financial transaction component 220 enables the computing device 200 to process one or more financial transactions. For example, the financial transaction component 220 may be configured to obtain a request for authorization associated with a financial transaction (e.g., via the interface component 210), and/or generate a response to the request for authorization for transmission to a client device 110 (e.g., via the interface component 210). In some embodiments, the financial transaction is associated with a product, and transaction data associated with the financial transaction includes product data. In this manner, the request for authorization and/or a corresponding transaction receipt may be analyzed to extract or identify product data from the request for authorization and/or transaction receipt. In some embodiments, the financial transaction component 220 generates the transaction receipt based on the transaction data.

The registration component 230 enables the computing device 200 to register a product with a protection system 152 to obtain protection or coverage for the product under a protection mechanism 154. For example, the registration component 230 may be configured to obtain from the financial transaction component 220 (e.g., via the interface component 210) product data associated with a product, and/or generate a request for identification including the product data for transmission to one or more protection systems 152 (e.g., via the interface component 210). The request for identification may be used to identify, based on the product data, one or more potential protection mechanisms 154 associated with the product. Based on selection data associated with at least one protection mechanism 154 selected from the potential protection mechanisms 154, the registration component 230 is configured to identify a protection system 152 associated with the protection mechanism 154, and/or generate a request for registration including the product data for registering the product with the protection system 152.

The registration component 230 may generate a notification that indicates a remaining protection term associated with the protection mechanism 154 for transmission to a client device 110 (e.g., via the interface component 210). In some embodiments, the registration component 230 determines whether the remaining protection term satisfies a predetermined threshold. If the predetermined threshold is satisfied (e.g., the remaining protection term is less than or equal to the predetermined period of time), a notification indicative of the remaining protection term is generated and/or transmitted to the client device 110. In some embodiments, the notification includes a prompt for user input associated with the protection mechanism 154. The prompt may request, for example, that the consumer 104 provide user input that indicates a user interest in renewing, extending, or modifying the protection or coverage for the product under the protection mechanism 154.

The digital wallet component 240 enables the computing device 200 to manage an account using a digital wallet platform. In some embodiments, the digital wallet component 240 is configured to obtain account data associated with an account (e.g., cardholder account data associated with a cardholder account 134, financial account data associated with a financial account 144, protection data associated with a protection mechanism 154), and/or generate one or more wallet capsules 122 (e.g., cardholder capsule 130, financial capsule 140, protection capsule 150) based on the account data. For example, the digital wallet component 240 may be configured to obtain a protection statement including statement data associated with a protection mechanism 154 (e.g., via the interface component 210), and/or generate a protection capsule 150 corresponding to the protection mechanism 154 based on the statement data.

In some embodiments, the protection system 152 obtains a request for relief or a claim including statement data associated with a protection mechanism 154 from a client device 110 (e.g., via the interface component 210), identifies a protection system 152 associated with the protection mechanism 154, and/or communicates with the protection system 152 to obtain a response to the claim including disposition data (e.g., via the interface component 210). The digital wallet component 240 may, for example, update or modify the protection capsule 150 corresponding to the protection mechanism 154 based on the disposition data.

The digital wallet component 240 may generate a notification that indicates an update or modification to the protection mechanism 154 for transmission to a client device 110 (e.g., via the interface component 210). In some embodiments, the notification includes a prompt for user input associated with a financial account 144. The prompt may request, for example, that the consumer 104 provide user input that indicates a receiving financial account 144. Based on selection data associated with the receiving financial account 144, the digital wallet component 240 is configured to communicate with the protection system 152 to transfer electronic funds to the receiving financial account 144 in accordance with the disposition data. Alternatively, the digital wallet component 240 may identify, based on the statement data and/or disposition data, a financial account system 142 associated with the protection system 152 and/or the protection mechanism 154 (e.g., a sending financial account system 142), and transmit to the sending financial account system 142 (e.g., via the interface component 210) a request for transfer for transferring electronic funds to the receiving financial account 144.

Figure 3:
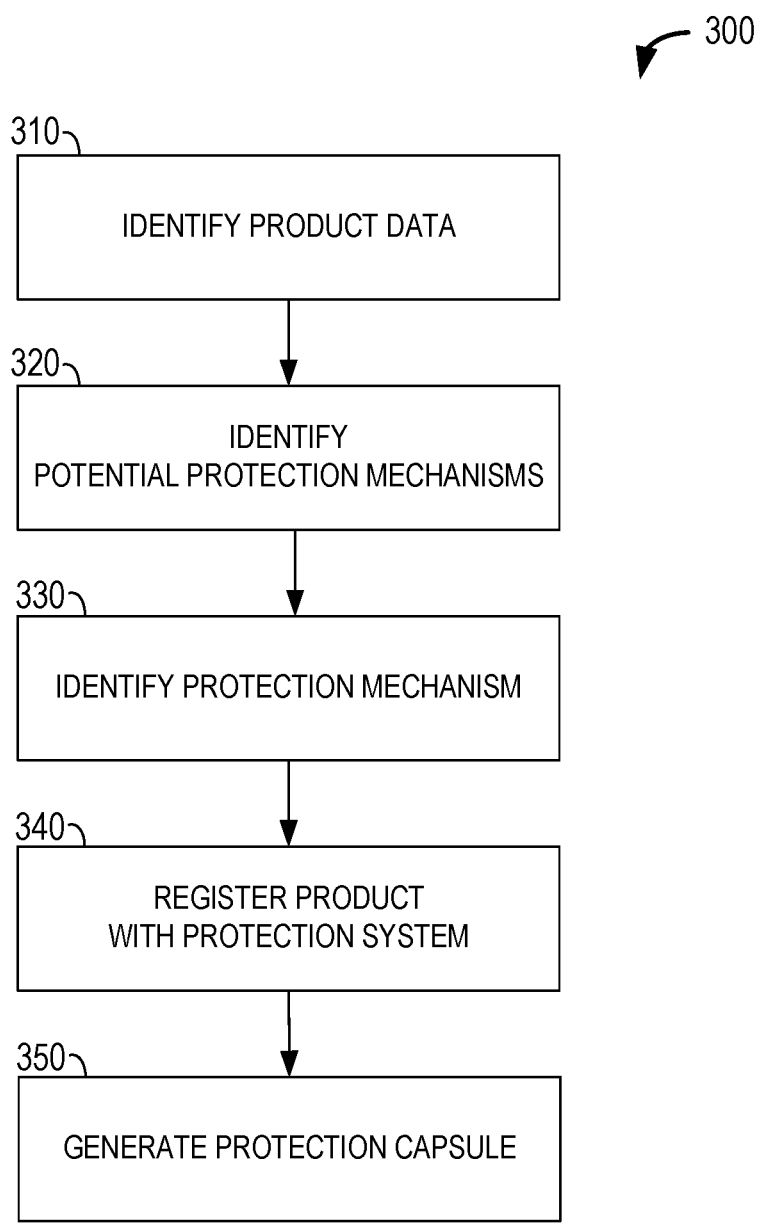
FIG. 3 is a flowchart of an example method that may be used for processing one or more transactions using a computing device, such as the computing device shown in FIG. 2.

FIG. 3 is a flowchart of an example method 300 for processing one or more financial transactions using a computing device 200 (shown in FIG. 2). Product data associated with a commercial product is identified at 310. In some embodiments, the product is associated with a financial transaction. For example, a request for authorization associated with the financial transaction may be received, and the request for authorization may be analyzed to identify transaction data including the product data associated with the financial transaction. Additionally or alternatively, a transaction receipt associated with the financial transaction may be identified, and the transaction receipt may be analyzed to identify transaction data including the product data associated with the financial transaction.

Based on the product data, one or more potential protection mechanisms 154 associated with the product is identified at 320. For example, a request for identification including the product data may be transmitted to a protection system 152 for identifying the one or more potential protection mechanisms 154. In some embodiments, the product data may be compared to a register of predetermined products (e.g., airline tickets, car rentals, electronics, flood insurance) associated with the protection mechanisms 154 to determine whether one or more potential protection mechanisms 154 may be identified. The potential protection mechanisms 154 may be communicated to a client device 110 for identifying at 330 at least one protection mechanism 154 of the potential protection mechanisms 154. The protection mechanism 154 may be identified, for example, based on selection data associated with a user selection at the client device 110.

A protection system 152 associated with the protection mechanism 154 may be identified based on selection data associated with the protection mechanism 154. In some embodiments, a financial transaction associated with the protection mechanism 154 is processed. The product is registered at 340 with the protection system 152 for providing protection for the product using the protection mechanism 154. For example, a request for registration including product data may be generated based on the selection data, and transmitted to the protection system 152. Based on statement data associated with the registration of the product with the protection system 152, a protection capsule 150 corresponding to the protection mechanism 154 is generated at 350. The protection capsule 150 may be accessible using, for example, a digital wallet 102 or, in some embodiments, an application for a stand-alone capsule.

Figure 4:
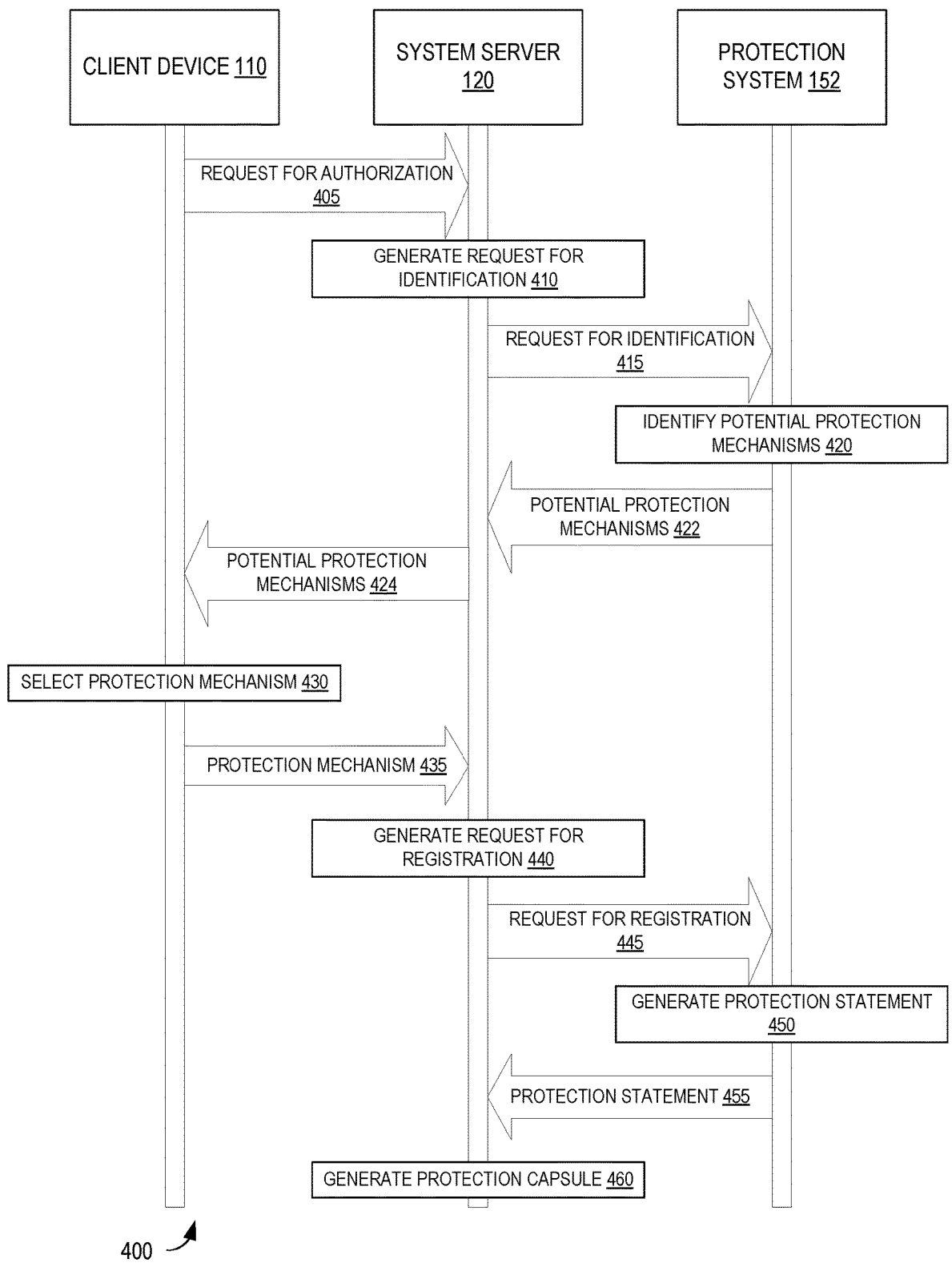
FIG. 4 is a sequence diagram for registering a product with a protection system in a system, such as the system shown in FIG. 1.

FIG. 4 is a sequence diagram 400 for registering a commercial product with a protection system 152 in a system 100 (shown in FIG. 1). In some embodiments, a client device 110 generates a request for authorization for a financial transaction associated with a cardholder account 134 at a client device 110, and transmits at 405 the request for authorization to a server system 120. Alternatively, the request for authorization may be generated at and/or transmitted from a computing device other than the client device 110 (e.g., a merchant device). The request for authorization may be analyzed to identify product data associated with a product that is associated with the financial transaction, and determine whether to authorize the financial transaction. For example, a response to the request for authorization may be generated at the system server 120. In some embodiments, the system server 120 generates a transaction receipt associated with the financial transaction, and analyzes the transaction receipt to identify the product data.

The system server 120 generates at 410 a request for identification including the product data associated with the product, and transmits at 415 the request for identification to a protection system 152. In some embodiments, the protection system 152 identifies at 420 one or more potential protection mechanisms 154 based on the product data, and transmits at 422 a response to the request for identification including protection data associated with the potential protection mechanisms 154 to the system server 120. Alternatively, the protection data associated with the potential protection mechanisms 154 may be transmitted directly to the client device 110 from the protection system 152. The potential protection mechanisms 154 are associated with the product.

In some embodiments, the server system 120 modifies the response to the request for authorization by incorporating or including the protection data associated with the potential protection mechanisms 154 into the request for authorization, and transmits at 424 the response to the request for authorization including the protection data associated with the potential protection mechanisms 154 to the client device 110. Alternatively, the protection data associated with the potential protection mechanisms 154 may be transmitted separate from the transmission of the response to the request for authorization. A consumer 104 may provide user input selecting at least one protection mechanism 154 from the potential protection mechanisms 154 at the client device 110. The client device 110 may generate selection data based on the user input to select at 430 the protection mechanism 154, and transmit at 435 the selected protection mechanism 154 to the system server 120.

Based on the selection data, the system server 120 generates at 440 a request for registration including the product data, and transmits at 445 the request for registration to the protection system 152 for registering the product with the protection system 152. In some embodiments, a protection system 152 associated with the selected protection mechanism 154 is identified based on the protection data associated with the selected protection mechanism 154. In some embodiments, the protection system 152 generates at 450 a protection statement including statement data associated with the selected protection mechanism 154, and transmits at 455 the protection statement including the statement data to the system server 120. The system server 120 generates a protection capsule 150 corresponding to the selected protection mechanism 154, such that the protection capsule 150 is accessible at the client device 110 via a digital wallet 102.

Figure 5:
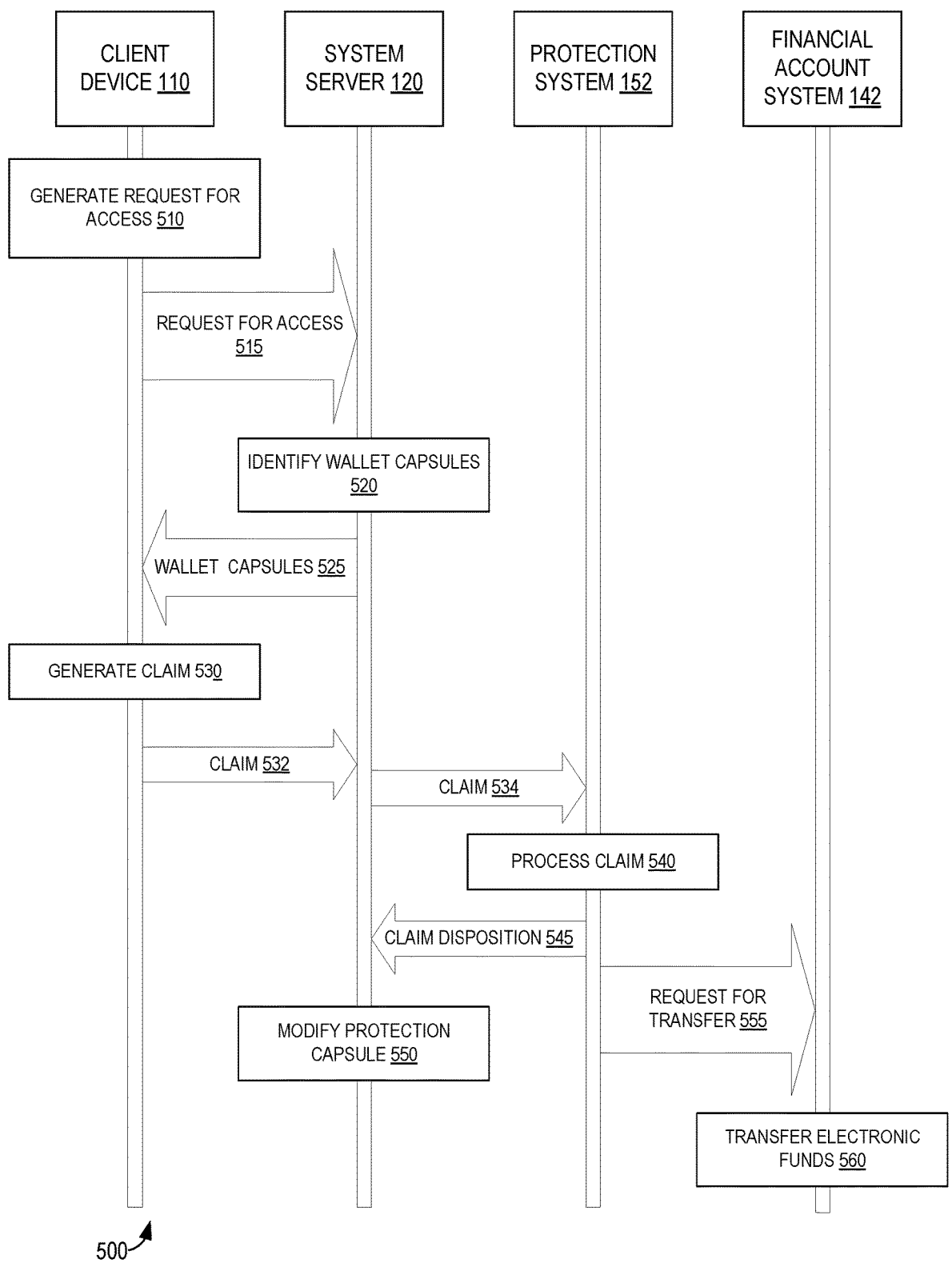
FIG. 5 is a sequence diagram for processing a claim in a system, such as the system shown in FIG. 1.

FIG. 5 is a sequence diagram 400 for processing a request for relief or a claim in a system 100 (shown in FIG. 1). In some embodiments, a client device 110 generates at 510 a request for access associated with a digital wallet 102, and transmits at 515 the request for access to a system server 120. The request for access may include login credentials for authenticating or confirming an identity of a user (e.g., consumer 104) of the client device 110. The system server 120 may identify a digital wallet 102 associated with the consumer 104 based on the login credentials, identify one or more wallet capsules 122 including a protection capsule 150 associated with the digital wallet 102, and transmit at 525 the wallet capsules 122 to the client device 110.

Once the consumer 104 is authorized to access the digital wallet 102 at the client device 110, the consumer 104 may identify a protection capsule 150 associated with a commercial product, and use the protection capsule 150 to generate at 530 a request for relief or a claim associated with the product. The claim may be transmitted at 532 to the system server 120, which is configured to identify a protection system 152 based on statement data associated with a protection mechanism 154 under which the claim is generated and forward or transmit at 534 the claim to the protection system 152. Alternatively, the claim may be transmitted directly to the protection system 152 from the client device 110.

The protection system 152 processes at 540 the claim to generate a response to the claim including disposition data, and transmits at 545 the response to the claim including the disposition data to the system server 120. In some embodiments, the protection capsule 150 is modified at 550 based on the disposition data. If it is determined that the consumer 104 is entitled to relief under the protection mechanism 154, electronic funds may be deposited into a financial account 144 associated with the consumer 104 (e.g., a receiving financial account). For example, the protection system 152 may generate a request for transfer associated with the receiving financial account 144, identify a financial account system 142 associated with the protection system 152 (e.g., a sending financial account system), and transmit at 555 the request for transfer to the sending financial account system 142 for transferring at 560 electronic funds from a financial account 144 associated with the protection system 152 (e.g., a sending financial account) to the receiving financial account. Alternatively, the client device 110 may generate and transmit a request for transfer to the sending financial account system 142 based on disposition data. In some embodiments, the system server 120 may receive, from a financial account system 142 associated with the consumer 104 (e.g., a receiving financial account system), a confirmation of a transfer of electronic funds to the receiving financial account 144. If the digital wallet 102 includes a financial capsule 140 that corresponds to the receiving financial account, the financial capsule 140 may be modified, for example, based on the confirmation of the transfer of electronic funds. Alternatively, notification of a pending transfer may be received at a digital wallet 102, which may await user input for allocation of electronic funds associated with the pending transfer.

In some embodiments, the receiving financial account is a financial account 144 associated with the consumer 104 that is registered with the protection system 152. Alternatively, the protection system 152 may generate and transmit a prompt for user input associated with a financial account 144 to the client device 110 based on the disposition data, and generate a request for transfer associated with a financial account 144 based on selection data associated with the financial account 144 received from the client device 110.

Figure 6:
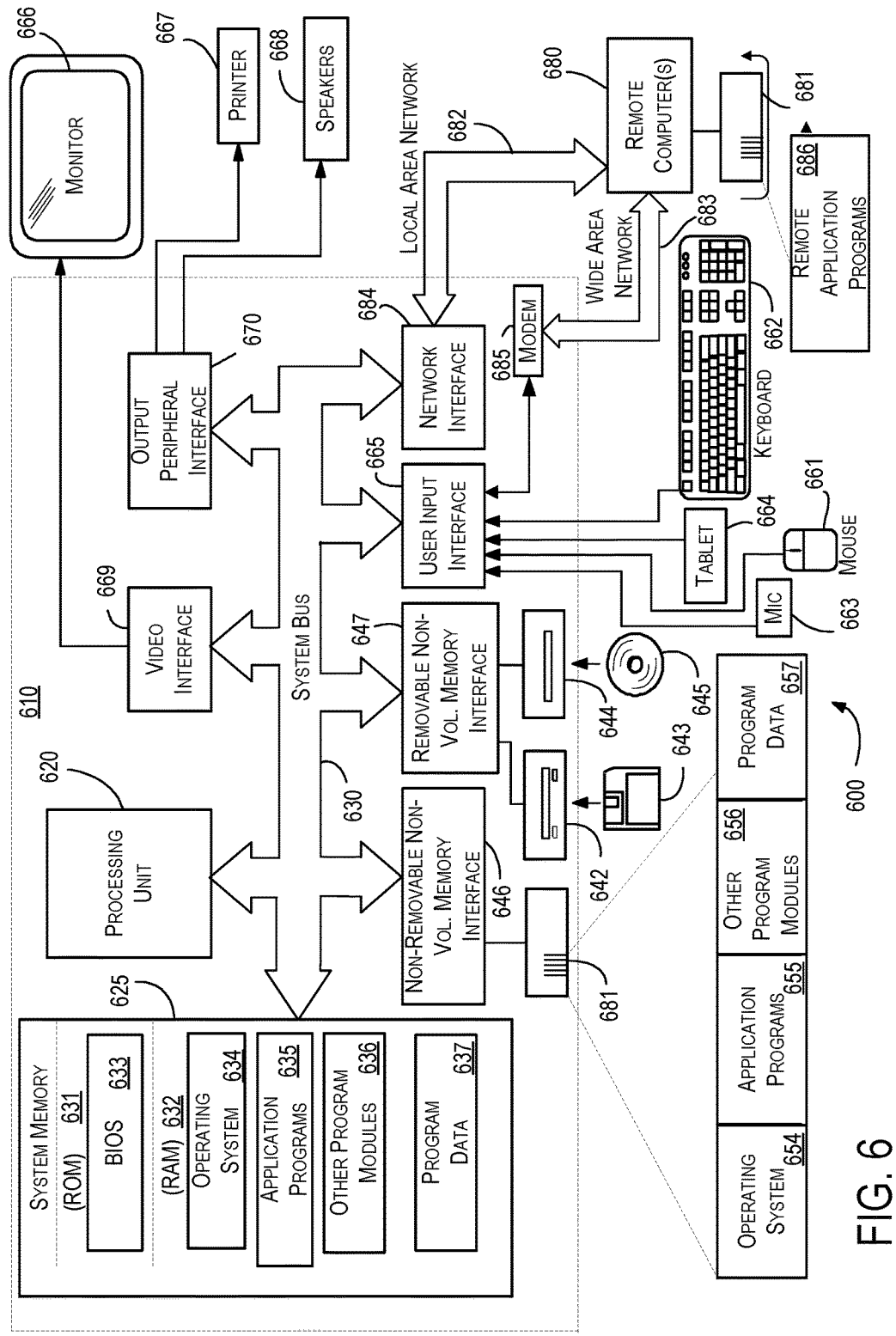
FIG. 6 is a block diagram of an example operating environment for managing one or more protection mechanisms.

FIG. 6 is a block diagram of an example operating environment 600 that may be used to manage one or more protection mechanisms 154. The operating environment 600 is only one example of a computing and networking environment and is not intended to suggest any limitation as to the scope of use or functionality of the disclosure. The operating environment 600 should not be interpreted as having any dependency or requirement relating to any one or combination of components illustrated in the example operating environment 600.

The disclosure is operational with numerous other computing and networking environments or configurations. While some examples of the disclosure are illustrated and described herein with reference to the operating environment 600 being or including a system server 120 (shown in FIG. 1) or a computing device 200 (shown in FIG. 2), aspects of the disclosure are operable with any computing device (e.g., client device 110, cardholder system 132, financial account system 142, protection system 152, interface component 210, financial transaction component 220, registration component 230, digital wallet component 240) that executes instructions to implement the operations and functionality associated with the operating environment 600.

For example, the operating environment 600 may include a mobile device, a smart watch or device, a mobile telephone, a phablet, a tablet, a portable media player, a netbook, a laptop, a desktop computer, a personal computer, a server computer, a computing pad, a kiosk, a tabletop device, an industrial control device, a multiprocessor system, a microprocessor-based system, a set top box, programmable consumer electronics, a network computer, a minicomputer, a mainframe computer, a distributed computing environment that include any of the above systems or devices, and the like. The operating environment 600 may represent a group of processing units or other computing devices. Additionally, any computing device described herein may be configured to perform any operation described herein including one or more operations described herein as being performed by another computing device.

With reference to FIG. 6, an example system for implementing various aspects of the disclosure may include a general purpose computing device in the form of a computer 610. Components of the computer 610 may include, but are not limited to, a processing unit 620 (e.g., a processor), a system memory 625 (e.g., a computer-readable storage device), and a system bus 630 that couples various system components including the system memory 625 to the processing unit 620. The system bus 630 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 625 includes any quantity of media associated with or accessible by the processing unit 620. For example, the system memory 625 may include computer storage media in the form of volatile and/or nonvolatile memory, such as read only memory (ROM) 631 and random access memory (RAM) 632. The ROM 631 may store a basic input/output system 633 (BIOS) that facilitates transferring information between elements within computer 610, such as during start-up. The RAM 632 may contain data and/or program modules that are immediately accessible to and/or presently being operated on by processing unit 620. For example, the system memory 625 may store computer-executable instructions, communication data, authentication data, application data, and other data.

The processing unit 620 may be programmed to execute the computer-executable instructions for implementing aspects of the disclosure, such as those illustrated in the figures (e.g., FIGS. 3-5). By way of example, and not limitation, FIG. 6 illustrates operating system 634, application programs 635, other program modules 636, and program data 637. The processing unit 620 includes any quantity of processing units, and the instructions may be performed by the processing unit 620 or by multiple processors within the operating environment 600 or performed by a processor external to the operating environment 600.

The system memory 625 may include computer-executable instructions, digital wallet data, capsule data, cardholder data, financial data, protection data, account data, cardholder account data, financial account data, transaction data, product data, statement data, disposition data, and other data. For example, the system memory 625 may include an interface component 210 (shown in FIG. 2), a financial transaction component 220 (shown in FIG. 2), a registration component 230 (shown in FIG. 2), and/or a digital wallet component 240 (shown in FIG. 2) for implementing aspects of the disclosure.

Upon programming or execution of these components, the operating environment 600 and/or processing unit 620 is transformed into a special purpose microprocessor or machine. For example, the interface component 210, when executed by the processing unit 620, causes the computer 610 to transmit protection data associated with one or more potential protection mechanisms 154, receive selection data associated with a protection mechanism 154, transmit a request for registration, and/or receive a response to the request for registration; the financial transaction component 220, when executed by the processing unit 620, causes the computer 610 to obtain product data associated with a product; the registration component 230, when executed by the processing unit 620, causes the computer 610 to identify one or more potential protection mechanisms 154 associated with a product, and/or generate a request for registration associated with the product, and/or the digital wallet component 240, when executed by the processing unit 620, causes the computer 610 to generate a protection capsule 150 corresponding to a protection mechanism 154. Although the processing unit 620 is shown separate from the system memory 625, embodiments of the disclosure contemplate that the system memory 625 may be onboard the processing unit 620 such as in some embedded systems.

The computer 610 includes a variety of computer-readable media. Computer-readable media may be any available media that may be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 631 and RAM 632 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 610. Computer storage media are implemented in hardware and exclude carrier waves and propagated signals. Any such computer storage media may be part of computer 610.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 610 through one or more input devices, such as a pointing device 661 (e.g., mouse, trackball, touch pad), a keyboard 662, a microphone 663, and/or an electronic digitizer 664 (e.g., tablet). Other input devices not shown in FIG. 6 may include a joystick, a game pad, a controller, a satellite dish, a camera, a scanner, an accelerometer, or the like. These and other input devices may be coupled to the processing unit 620 through a user input interface 665 that is coupled to the system bus 630, but may be connected by other interface and bus structures, such as a parallel port, game port or a universal serial bus (USB).

Information, such as text, images, audio, video, graphics, alerts, and the like, may be presented to a user via one or more presentation devices, such as a monitor 666, a printer 667, and/or a speaker 668. Other presentation devices not shown in FIG. 6 may include a projector, a vibrating component, or the like. These and other presentation devices may be coupled to the processing unit 620 through a video interface 669 (e.g., for a monitor 666 or a projector) and/or an output peripheral interface 670 (e.g., for a printer 667, a speaker 668, and/or a vibration component) that are coupled to the system bus 630, but may be connected by other interface and bus structures, such as a parallel port, game port or a USB. In some embodiments, the presentation device is integrated with an input device configured to receive information from the user (e.g., a capacitive touch-screen panel, a controller including a vibrating component). Note that the monitor 666 and/or touch screen panel may be physically coupled to a housing in which the computer 610 is incorporated, such as in a tablet-type personal computer.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 682 and one or more wide area networks (WAN) 683, but may also include other networks. Such networking environments are commonplace in offices, enterprise-wide computer networks, intranets and the Internet.

When used in a LAN networking environment, the computer 610 is coupled to the LAN 682 through a network interface or adapter 684. When used in a WAN networking environment, the computer 610 may include a modem 685 or other means for establishing communications over the WAN 683, such as the Internet. The modem 685, which may be internal or external, may be connected to the system bus 630 via the user input interface 665 or other appropriate mechanism. A wireless networking component including an interface and antenna may be coupled through a device, such as an access point or peer computer to a LAN 682 or WAN 683. In a networked environment, program modules depicted relative to the computer 610, or portions thereof, may be stored in the remote memory storage device. By way of example, and not limitation, FIG. 6 illustrates remote application programs 686 as residing on memory storage device 681. It may be appreciated that the network connections shown are examples and other means of establishing a communications link between the computers may be used.

The block diagram of FIG. 6 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 6 may be performed by other elements in FIG. 6, or an entity (e.g., processor, web service, server, applications, computing device, etc.) not shown in FIG. 6.

Figure 7:
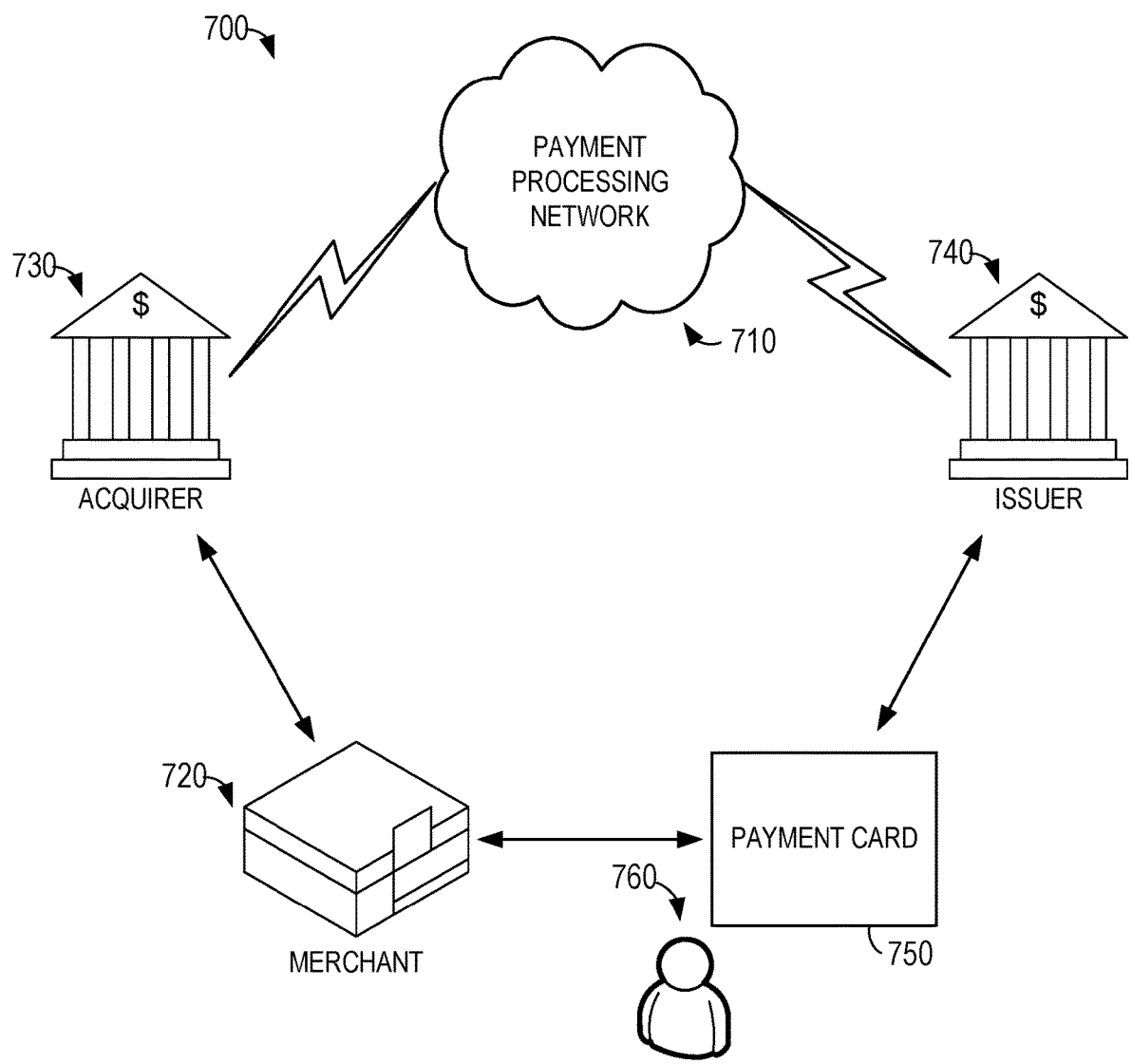
FIG. 7 is a block diagram illustrating an example environment for processing one or more financial transactions.

FIG. 7 is a block diagram illustrating an example environment 700 for processing one or more financial transactions. The system server 120 (shown in FIG. 1), for example, may process one or more financial transactions in the environment 700. The environment 700 includes a processing network 710, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 700 includes one or more merchants 720 that accept payment via the processing network 710. For example, payment may be accepted at the client device 110, the protection system 152, or a merchant device. To accept payment via the processing network 710, the merchant 720 establishes a financial account with an acquirer 730 that is a member of the processing network 710. The acquirer 730 is a financial institution that maintains a relationship with one or more merchants 720 to enable the merchants 720 to accept payment via the processing network 710. The acquirer 730 may also be known as an acquiring bank, a processing bank, or a merchant bank.

The environment 700 includes one or more issuers 740 that issue or provide payment cards 750 (e.g., credit card, debit card, prepaid card, and the like) or other payment products to one or more cardholders 760 (e.g., consumer 104) or, more broadly, account holders ("cardholder" and "account holder" may be used interchangeably herein). The issuer 740 is a financial institution that maintains a relationship with one or more cardholders 760 to enable the cardholders 760 to make a payment using the payment card 750 via the processing network 710.

A cardholder 760 uses a payment product, such as a payment card 750, to purchase a good or service (e.g., product, protection mechanism 154) from a merchant 720. In some embodiments, the payment card 750 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 750 to purchase a good or service from a merchant 720. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 760 may use any payment product that is linked or associated with a corresponding financial account maintained by an issuer 740. As described herein, the term "payment card" includes credit cards, debit cards, prepaid cards, digital cards, smart cards, and any other payment product that is linked or associated with a corresponding financial account maintained by an issuer 740. Payment cards 750 may have any shape, size, or configuration that enables the environment 700 to function as described herein.

A cardholder 760 may present the merchant 720 with a payment card 750 to make a payment to the merchant 720 in exchange for a good or service. Alternatively, the cardholder 760 may provide the merchant 720 with account information associated with the payment card 750 without physically presenting the payment card 750 (e.g., for remote financial transactions including e-commerce transactions, card-not-present transactions, or card-on-file transactions). Account information may include a name of the cardholder 760, an account number, an expiration date, and/or a security code (such as a card verification value (CVV), a card verification code (CVC), and the like).

The merchant 720 requests authorization from an acquirer 730 for at least the amount of the purchase. The merchant 720 may request authorization using any financial transaction computing device configured to transmit account information of the cardholder 760 to one or more financial transaction processing computing devices of the acquirer 730. For example, the merchant 720 may request authorization through a point-of-sale (POS) terminal, which reads account information of the cardholder 760 from a microchip or magnetic stripe on the payment card 750, and transmits the cardholder's account information to the one or more financial transaction processing computing devices of the acquirer 730. For another example, the POS terminal reads account information of the cardholder 760 from a device configured to communicate with the POS terminal using contactless payment technology, and transmits the cardholder's account information to one or more financial transaction processing computing devices of the acquirer 730.

Using the processing network 710, the financial transaction processing computing devices of the acquirer 730 communicate with one or more financial transaction processing computing devices of an issuer 740 to determine whether the account information of the cardholder 760 matches or corresponds to the account information of the issuer 740, whether the account is in good standing, and/or whether the purchase is covered by (e.g., less than) a credit line or account balance associated with the financial account. Based on these determinations, the financial transaction processing computing devices of the issuer 740 determine whether to approve or decline the request for authorization from the merchant 720.

If the request for authorization is declined, the merchant 720 is notified as such, and may request authorization from the acquirer 730 for a lesser amount or request an alternative form of payment from the cardholder 760. If the request for authorization is approved, an authorization code is issued to the merchant 720, and the cardholder's available credit line or account balance is decreased. The financial transaction is then settled between the merchant 720, the acquirer 730, the issuer 740, and/or the cardholder 760. Settlement typically includes the acquirer 730 reimbursing the merchant 720 for selling the good or service, and the issuer 740 reimbursing the acquirer 730 for reimbursing the merchant 720. When a credit card is used, the issuer 740 may bill the cardholder 760 to settle a financial account associated with the cardholder 760. When a debit or prepaid card is used, the issuer 740 may automatically withdraw funds from the account.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for managing one or more protection mechanisms configured to protect one or more products. For example, the elements illustrated in FIGS. 1, 2, and 4-7, such as when encoded to perform the operations illustrated in FIGS. 3-5, constitute at least an example means for identifying product data associated with a product (e.g., financial transaction component 220); an example means for identifying a protection mechanism 154 (e.g., registration component 230, digital wallet component 240); an example means for identifying one or more potential protection mechanisms 154 associated with a product based on product data (e.g., registration component 230); an example means for generating a request for registration associated with a product for registering the product with a protection system 152 associated with a protection mechanism 154 (e.g., registration component 230); and/or an example means for generating a protection capsule 150 corresponding to a protection mechanism 154 (e.g., digital wallet component 240).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computing device for managing one or more protection mechanisms, the computing device comprising:
    a memory device storing computer-executable instructions; and
    a processor configured to execute the computer-executable instructions to:
        identify a product associated with a financial transaction;
        based on the identified product, identify product data associated with the product;
        analyze the product data to identify a plurality of potential protection mechanisms associated with the product, the plurality of potential protection mechanisms comprising one or more insurance policies and a warranty associated with the product;
        transmit a request to a client device associated with a user to select a protection mechanism of the identified plurality of potential protection mechanisms;
        receive, from the client device, a selection of a protection mechanism of the identified plurality of potential protection mechanisms;
        identify a protection provider associated with the selected protection mechanism;
        transmit a request to the identified protection provider to register the product with the identified protection provider;
        receive, from the identified protection provider, a response to the request for registration, the response including statement data;
        generate, based on the statement data, a protection capsule corresponding to the selected protection mechanism, the protection capsule including the product data and the selected protection mechanism;
        transmit, to the client device, the protection capsule, wherein the client device stores data associated with the protection capsule;
        receive a claim for relief associated with the product, generated by the client device based on the data stored in the protection capsule;
        transmit the claim and the data stored in the protection capsule to the identified protection provider to provide relief based on the selected protection mechanism and the data stored in the protection capsule;
        receive, from the identified protection provider, a response to the claim for relief including disposition data associated with the at least one protection mechanism, the disposition data including a request to transfer funds from an account associated with the protection provider to an account associated with the user; and
        based on the disposition data, modify the protection capsule.

2. The computing device of claim 1, wherein the processor is further configured to execute the computer-executable instructions to:
    receive, from the client device, a confirmation of the transfer of funds from the account associated with the protection provider to the account associated with the user.

3. The computing device of claim 1, wherein the processor is further configured to execute the computer-executable instructions to:
    receive a transaction receipt associated with the transfer of funds from the account associated with the protection provider to the account associated with the user.

4. The computing device of claim 1, wherein the processor is further configured to execute the computer-executable instructions to:
    generate a request for identification associated with the product, the request for identification including the product data associated with the product;
    transmit, to one or more computing systems including the protection provider, the request for identification; and
    receive, from the one or more computing systems, one or more responses to the request for identification including protection data associated with the plurality of potential protection mechanisms, wherein the plurality of potential protection mechanisms are identified based on the product data.

5. The computing device of claim 1, wherein the protection capsule is accessible through an application without accessing a digital wallet.

6. The computing device of claim 1, wherein the processor is further configured to execute the computer-executable instructions to:
    receive, from the client device, a request for access associated with a digital wallet, the request for access including a wallet identifier associated with the digital wallet, the digital wallet including data associated with the protection capsule;
    based on the wallet identifier, identify one or more wallet capsules including the protection capsule; and
    transmit, to the client device, a response to the request for access including capsule data associated with the one or more wallet capsules.

7. The computing device of claim 1, wherein the processor is further configured to execute the computer-executable instructions to:
    synchronize the data associated with the protection module stored on the client device with a corresponding protection module stored on the computing device.

8. The computing device of claim 6, wherein the processor is further configured to execute the computer-executable instructions to:
    hyperlink the one or more wallet capsules to another wallet capsule to allow the user to navigate across a plurality of wallet capsules.

9. The computing device of claim 6, wherein the processor is further configured to execute the computer-executable instructions to:
    based on the disposition data, generate a prompt for user input associated with a financial account, the financial account corresponding to a financial capsule accessible using the digital wallet; and
    transmit, to the client device, the prompt for user input associated with the financial account.

10. The computing device of claim 6, wherein the processor is further configured to execute the computer-executable instructions to:
    receive, from the client device, selection data associated with a financial account, the financial account corresponding to a financial capsule accessible using the digital wallet;
    based on the selection data, generate a request for transfer associated with the financial account, the request for transfer including a financial account identifier associated with the financial account;
    transmit, to a first financial account system associated with the protection provider, the request for transfer;
    receive, from a second financial account system, a confirmation of a transfer of funds to the financial account; and
    based on the confirmation, modify the protection capsule and the financial capsule.

11. The computing device of claim 1, wherein the processor is further configured to execute the computer-executable instructions to:
    determine whether a protection term associated with the selected protection mechanism satisfies a threshold; and
    on condition that the protection term satisfies the threshold, generate a prompt for user input associated with the at least one protection mechanism, and transmit, to the client device, the prompt for user input associated with the at least one protection mechanism, the user input indicating a user interest in renewing, extending, or modifying at least one of the one or more insurance policies associated with the product.

12. A computer-implemented method for managing one or more protection mechanisms, the computer-implemented method comprising:
    identifying, by a processor, a product associated with a financial transaction;
    based on the identified product, obtaining, by the processor, product data associated with the product;
    analyzing the product data for identifying a plurality of potential protection mechanisms associated with the product, the plurality of potential protection mechanisms comprising one or more insurance policies and a warranty associated with the product;
    transmitting a request to a client device, associated with a user, to select a protection mechanism of the identified plurality of potential protection mechanisms;
    receiving, from the client device, a selection of a protection mechanism of the identified plurality of potential protection mechanisms;
    identifying a protection provider associated with the selected protection mechanism;
    transmitting a request to the identified protection provider to register the product with the protection provider;
    receiving, from the identified protection provider, a response to the request for registration, the response including statement data;
    generating, based on the statement data, a protection capsule corresponding to the selected protection mechanism;
    transmitting, to the client device, the protection capsule, wherein the client device stores data associated with the protection capsule;
    receiving a claim for relief associated with the product, generated by the client device based on the data stored in the protection capsule;
    transmitting the claim and the data stored in the protection capsule to the identified protection provider to provide relief based on the selected protection mechanism and the data stored in the protection capsule;
    receiving, from the identified protection provider, a response to the claim for relief including disposition data associated with the at least one protection mechanism, wherein the disposition data includes a request to transfer funds from an account associated with the protection provider to an account associated with the user;
    based on the disposition data, modifying the protection capsule.

13. The computer-implemented method of claim 12 further comprising receiving, from the client device, a confirmation of the transfer of funds from the account associated with the protection provider to the account associated with the user.

14. The computer-implemented method of claim 12, wherein identifying the one or more potential protection mechanisms comprises:
    generating a request for identification associated with the product, the request for identification including the product data;
    transmitting, to one or more computing systems including the protection provider, the request for identification; and
    receiving, from the one or more computing systems, one or more responses to the request for identification including protection data associated with the plurality of potential protection mechanisms.

15. The computer-implemented method of claim 12 further comprising receiving a transaction receipt associated with the transfer of funds from the account associated with the protection provider to the account associated with the user.

16. The computer-implemented method of claim 12 further comprising synchronizing the data associated with the protection module stored on the client device with a corresponding protection module stored on a system server.

17. The computer-implemented method of claim 12 further comprising:
    upon receiving, from the protection provider, flail the response to the claim for relief including the disposition data, generating a prompt for user input associated with a financial account;
    transmitting, to the client device, the prompt for user input associated with the financial account;
    upon receiving, from the client device, selection data associated with the financial account, generating a request for transfer including a financial account identifier associated with the financial account based on the selection data, the financial account associated with a financial capsule accessible using a digital wallet;
    transmitting, to a first financial account system associated with the protection provider, the request for transfer; and upon receiving, from a second financial account system associated with the financial account, a confirmation of a transfer of funds to the financial account, modifying the protection capsule and the financial capsule based on the confirmation.

18. The computer-implemented method of claim 12 further comprising:

determining whether a protection term associated with the selected protection mechanism satisfies a threshold; and on condition that the protection term satisfies the threshold, generating a prompt for user input associated with the selected protection mechanism, and transmitting, to the client device, the prompt for user input associated with the selected protection mechanism.

19. A computer-readable storage device having computer-executable instructions embodied thereon, the computer-readable storage device comprising:

a financial transaction component that, upon execution by at least one processor, causes a computing device associated with a user to identify product data associated with a product, the product associated with a financial transaction;

a protection mechanism registration component that, upon execution by the at least one processor, causes the computing device to analyze the product data to identify a plurality of potential protection mechanisms associated with the product, the plurality of potential protection mechanisms comprising one or more insurance policies and a warranty associated with the product, transmit, to a client device associated with the user, a request to select a protection mechanism of the identified plurality of potential protection mechanisms and receive, from the client device, a selection of a protection mechanism of the identified plurality of potential protection mechanisms;

a digital wallet component that, upon execution by the at least one processor, causes the computing device to identify a protection provider associated with the selected protection mechanism, and generate a request to register the product with the protection provider, the digital wallet component upon execution by the at least one processor, further causes the computing device to:

receive, from the identified protection provider, a response to the request for registration, the response including statement data;

generate, based on the statement data, a protection capsule corresponding to the selected protection mechanism, the protection capsule including the product data and the selected protection mechanism;

transmit, to the client device, the protection capsule, wherein the client device stores data associated with the protection capsule;

receive a claim for relief associated with the product, generated by the client device based on the data stored in the protection capsule;

transmit the claim and the data stored in the protection capsule to the identified protection provider to provide relief based on the selected protection mechanism and the data stored in the protection capsule;

receive, from the identified protection provider, a response to the claim for relief including disposition data associated with the at least one protection mechanism, wherein the disposition data includes a request to transfer funds from an account associated with the protection provider to an account associated with the user; and based on the disposition data, modify the protection capsule.

20. The computer-readable storage device of claim 19, wherein the computing device receives a transaction receipt associated with the transfer of funds from the account associated with the protection provider to the account associated with the user.

* * * * *